(12) United States Patent
Schultz et al.

(10) Patent No.: US 11,558,262 B2
(45) Date of Patent: Jan. 17, 2023

(54) METHOD AND AN APPARATUS FOR FAULT PREDICTION IN NETWORK MANAGEMENT

(71) Applicant: Nokia Solutions and Networks Oy, Espoo (FI)

(72) Inventors: Benedek Schultz, Budapest (HU); Janne Tapio Ali-Tolppa, Pirkkala (FI); Márton Kajó, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/297,378

(22) PCT Filed: Nov. 28, 2018

(86) PCT No.: PCT/EP2018/082814
§ 371 (c)(1),
(2) Date: May 26, 2021

(87) PCT Pub. No.: WO2020/108747
PCT Pub. Date: Jun. 4, 2020

(65) Prior Publication Data
US 2022/0021587 A1    Jan. 20, 2022

(51) Int. Cl.
*H04L 29/08* (2006.01)
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC .............................. H04L 41/147; H04L 41/16
See application file for complete search history.

(56) References Cited

U.S. PATENT DOCUMENTS

2017/0061328 A1* 3/2017 Majumdar ............. G06K 9/627
2021/0359899 A1* 11/2021 Wang ................... H04L 41/0609

FOREIGN PATENT DOCUMENTS

| EP | 3131234 A1 | 2/2017 |
| EP | 3382938 A1 | 10/2018 |

(Continued)

OTHER PUBLICATIONS

Bodrog et al., "Demonstrator of KPI Analytics for Anomaly Detection and Diagnosis in Mobile Networks (Demo)", PIMRC, 2017, 3 pages.

(Continued)

*Primary Examiner* — Adnan M Mirza
(74) *Attorney, Agent, or Firm* — Nokia Technologies Oy

(57) ABSTRACT

Network management apparatus and methods are described. A network management apparatus comprises network data receiving means for receiving network data that is representative of the current condition of a communications network, the network data comprising a plurality of values indicative of the performance of network elements; network data transformation means for transforming the received network data into a network state vector that is indicative of a current state of the network; and network state prediction means for predicting a future network state vector of the network from the current network state vector, the network state prediction means comprising a self-learning prediction module having a memory for storing at least one internal state.

15 Claims, 6 Drawing Sheets

(56) References Cited

FOREIGN PATENT DOCUMENTS

WO       2018/157951  A1    9/2018
WO       2020/015831  A1    1/2020

OTHER PUBLICATIONS

Bodrog et al., "A Robust Algorithm for Anomaly Detection in Mobile Networks", IEEE 27th Annual International Symposium on Personal, Indoor, and Mobile Radio Communications (PIMRC), Sep. 4-8, 2016, 6 pages.
Ciocarlie et al., "Diagnosis Cloud: Sharing Knowledge Across Cellular Networks", 12th International Conference on Network and Service Management (CNSM), Oct. 31-Nov. 4, 2016, 5 pages.
Kajo et al., "Equal-Volume Quantization of Network Data Using Bounding Spheres and Boxes", IEEE/IFIP Network Operations and Management Symposium, Apr. 23-27, 2018, 9 pages.
European Application No. 18178314.3, "Methods and Apparatus to Determine a Model, use the Model and Update the Model", filed on Jun. 18, 2018, 21 pages.
Hochreiter et al., "Long short-term Memory", Neural Computation, vol. 9, No. 8, 1997, pp. 1-32.
International Search Report and Written Opinion received for corresponding Patent Cooperation Treaty Application No. PCT/EP2018/082814, dated May 31, 2019, 14 pages.
Palacios et al., "Self-Healing Framework for Next-Generation Networks through Dimensionality Reduction", IEEE Communications Magazine, vol. 56, No. 7, Jul. 2018, pp. 170-176.

\* cited by examiner

METHOD AND AN APPARATUS FOR FAULT PREDICTION IN NETWORK MANAGEMENT

RELATED APPLICATION

This application was originally filed as Patent Cooperation Treaty Application No. PCT/EP2018/082814 filed Nov. 28, 2018, each of which is incorporated herein by reference in its entirety.

TECHNICAL FIELD

The present document relates to a method and an apparatus for network management and fault prediction, in particular for mobile networks.

BACKGROUND

Management of communications networks such as mobile networks relies heavily on the use of rulesets, generated and maintained by operators or network architects. As networks increase in size, complexity, and diversity, this approach is becoming less viable due to excessive human labour requirements. To reduce labour intensity, implementing automated rule generation derived from example data sets—a process called machine learning—is currently the most successful alternative.

Self-Organizing Networks (SON) can use generated rulesets for fault detection, diagnosis and deployment of corrective actions in order to implement automated self-healing of networks. So far, these efforts are mainly done under strict human supervision and are focused on reactive self-healing; the correction of degradations after these have become damaging/apparent. With the use of precise machine-learned rules/models that describe the networks, a more advanced self-healing could be achieved, where faults are predicted and corrected in a very early stage, avoiding performance degradation altogether. This concept is called proactive self-healing, where measures are taken to prevent the occurrence of faults.

In many cases, off-the-shelf machine learning algorithms perform poorly in their respective tasks. This is caused by case-by-case differences in the structure of data generated by the monitored systems or the behaviour of the systems themselves that these algorithms try to model. Mobile networks pose a unique environment for machine learning algorithms in this sense, because of the unusually large number of influencing factors that stem from outside of the network, such as, human diurnal behaviour, weather, user movement, etc. Another aspect of mobile networks is the interconnected behaviour of many distinct elements, such as base-stations or gateways. It is likely that using machine-learning algorithms without adapting them to this unique environment means not utilizing them to their fullest potential. Mobile network data is unique, in that it exhibits complex temporal, spatial and dimensional correlations, often all three at the same time. Since currently the strongest state-of-the-art machine learning model builders are Deep Neural Networks, it is a logical aspiration to use them for learning and predicting mobile network behaviour. One choice for modelling the sequential data collected in the mobile domain is Recurrent Neural Networks (RNN), in particular Long-Short Term Memory RNNs (LSTMs).

Network Performance Management (PM) data, which is the basic input for most of the network optimization and self-healing use cases, consists of continuous numerical values (also called Key Performance Indicators, KPIs). These values form a multi-dimensional stream of data that is collected from measurements at a large number of network elements. The problem is that RNNs are similar to state-machines, which makes them better suited to work on quantized or discrete streams of data, such as written text. This mismatch in the data structure causes a degradation in the prediction accuracy of the LSTM when used directly on PM data, reducing the possibility of early detection of faults when used for proactive self-healing. Such prognostic self-healing functions would be very desirable in cognitive network management, since they would improve the system's capability to detect faults before they cause a service degradation.

SUMMARY

In a broad aspect, the present disclosure provides a network management apparatus comprising network data receiving means configured for receiving network data that is representative of the current condition of a communications network. The network data may be measured data or derived from measured data, and comprises a plurality of values indicative of the performance of network elements or of the communication network. The communication network may be a mobile network or any other type of communications network having a plurality of network elements. The network data may comprise performance management (PM) data for the network and/or configuration management (CM) data. The network data may comprise a plurality of measured continuous numerical values (Key Performance Indicators, KPIs). For example, the network data may relate to performance indicators for voice and/or data communications handled by the network, and may comprise one or more of: traffic indicators, throughput indicators, latency indicators, delay indicators, availability indicators, accessibility indicators, success rates, failure rates, etc. for individual network elements (e.g. antenna, base-station, gateways, routers, etc.) or the entire network. Further examples for KPIs are presented below. The network management apparatus may receive the network data directly from the network elements where they are measured, from a network management database, and/or via other network entities. In that context, the network data receiving means may comprise a data communication interface and/or a database interface.

The network management apparatus further comprises network data transformation means configured for transforming the received network data into a network state vector that is indicative of a current state of the network. In other words, the network data transformation means maps the (possibly high dimensional) vector of measured performance values into a state space for the network. The state space of the network may comprise a plurality of states for working/nonworking conditions, load conditions, faults, etc. for individual network elements (e.g. antenna, base-station, gateways, routers, etc.) or the entire network. The network state vector may comprise an element for each considered state. The value of a state vector element may represent the likelihood or probability of the network being in that state.

The network management apparatus further comprises a network state prediction means configured for predicting a future network state vector for the network for time instant (t+1) from the current network state vector of the network for time instant (t). The network state prediction means comprises a self-learning prediction module having a memory for storing at least one internal state. The self-learning prediction module has been trained on training data to automatically learn the prediction of future network states based on current network states. During training, internal parameters of the prediction module may be automatically determined from the training data. After training of the internal parameters, the prediction module is configured to perform the intended prediction function. The self-learning prediction module comprises an internal memory to store history information, e.g. previous network states or internal states which may be an amalgamation of the previously seen states. Thus, the function of the network state prediction is to predict the next state of the network from a current state and the stored history information (e.g. a specified number of previous states). Thus, the self-learning prediction module does not simply provide a fixed mapping of states, but it operates based on internal states that can encode the history, e.g. a number of previous network states, so that the prediction depends on a sequence of states that the network went through before.

The network data transformation means may comprise a vector quantizer configured for transforming a vector of network data into a network state space. Such vector quantizer assigns an input vector to a quantum or centroid that best represents the input vector according to a quantization criterion. In many cases, the quantization criterion is an error function based on the distance between input vector and its closest quantum using a given metric. The vector quantizer may be automatically learned from training data by using an algorithm that determines a number of quanta (centroids) that minimize the error function for the training data. The learned set of quanta then corresponds to the states of the network, where each quantum represents a certain network state. In other words, the set of quanta corresponds to the set of considered network states. In embodiments, the vector quantizer may be based on the K-Means algorithm or the Bounding Sphere Quantization (BSQ) algorithm for automatically determining the set of quanta for the training data. During operation, the vector quantizer may determine and indicate the closest quantum for an input vector. Thus, the vector quantizer may provide an indication (e.g. an index) of the closest quantum for the current network data vector as an indication of the most likely network state.

The network data transformation means may comprise a distance transformation module configured for generating the network state vector that represents the probabilities of network states. The distance transformation module may transform the vector of network data into probability or likelihood values for the network states, taking into account the set of quanta of the quantizer as representations of the states. As such, the distance transformation module may determine, for each state, a value that indicates the probability or likelihood that the vector of network data is affiliated with a particular state of the set of states. Thus, by using the distance transformation, not only the most likely network state is determined, but a probability scoring/ranking for all network states is provided which indicates how relevant a state is for the present network condition as measured by the network data.

In embodiments, the distance transformation module may apply a soft-distance transformation on the vector of network data, using the quanta of the vector quantizer for structuring the vector space and providing the references (centroids) for distance measurements. The soft-distance transformation may measure the distance between the vector of network data and each quantum (centroid) to provide a measure of similarity between the input vector and the network states (represented by the quanta). The measures of similarity for the network states may be used as network state vector. The distance transformation module may subsequently rescale the measures of similarity of the network state vector to unit length in order to ensure that all estimated values sum up to one and represent proper probabilities.

The network data transformation means may comprise a data sparsing module configured for suppressing elements of the network state vector representing a low probability for a corresponding network state. Thus, only network states that have a reasonable probability of being affiliated with the present network data, i.e. quanta being close to the network data vector, are relevant (active) and receive a non-zero value in the network state vector. Other states are not relevant (inactive) for their quanta being too distant from the network data vector.

The data sparsing module may be based on the s-sparsing algorithm that zeros all vector elements but the s largest elements. In other words, the s largest values in the network state vector are determined and the other values are set to zero. In order to produce proper probability values for the individual states in the state vector, the data sparsing module may rescale the network state vector to unit length so that all its elements sum up to one. Alternatively, a threshold may be applied on the state vector and all elements having a probability below the threshold are zeroed.

The self-learning prediction module may comprise a recurrent neural network, in particular a long-short term memory (LSTM) recurrent neural network. Such neural networks have internal memory cells and are well suited to learn complex state mappings from an input vector representing the current network state to an output vector representing a future network state, depending on previous input vectors. These neural networks may be trained on training data to lean their internal parameters. Other neural network structures may be used as well, in particular networks having internal memory for storing internal states. In addition, other self-learning algorithms are applicable.

In order to produce proper probability values, the network state prediction may comprise a softmax module applied to the neural network output vector to generate a network state vector of unit length. In some cases, the softmax function is integrated into the output layer of the neural network. The softmax function, or normalized exponential function, is a generalization of the logistic function that "squashes" a k-dimensional vector of arbitrary real values to a k-dimensional vector of real values, where each entry is in the range (0, 1) and all the entries add up to 1. In probability theory, the output of the softmax function can be used to represent a categorical distribution—that is, a probability distribution over k different possible outcomes.

In the above approach, the network state prediction means generates a short-term predicted network state vector for the next time instant from the current network state vector and previous network states as encoded in internal states of the predictor. In order to generate a long-term prediction for more future time instants, the predicted network state vector may be used as an estimate of the next network state vector and looped back as input to the network data transformation means. For example, a predicted future network state vector for the next time instant (t+1)—predicted from the current network state at time (t)—may be fed back to the network data transformation means as input data for long-term prediction of further future network state vectors, e.g. for the next time instant (t+2). In other words, the predicted network state vector is used instead of actual network data for the prediction of future network state vectors. The prediction module may continue to iterate to predict future network state vectors for later time instants (t+3), (t+4), . . . . For example, the predicted future network state vector may be input to the data sparsing module which then suppresses state predictions with a low probability, and possibly rescales its output vector to sum up to one. This rescaled output vector of the data transformation means can then be input to the network state prediction for prediction of the network state vector for the next time instant. This allows an iterative sub-process for a long-term prediction of future network states over a number of time instants (starting from a current network state at time instant (t) and previous network states as encoded in internal states of the predictor) where the network state prediction is used in a loop reusing its own predictions as input for further predictions.

When new actual network data is available for the next time instant (t+1), the new network data is supplied to the network data transformation means as input, and a new prediction is made for the network state vector at time instant (t+2). Again, this prediction may be fed back to the network data transformation means for further prediction of a network state vector at time instant (t+3). This sub-process may be continued in an iterative way for long-term predictions, now starting from actual network data at next time instant (t+1). The prediction is looped-back to generate artificial (predicted) input for the next prediction, instead of using actual network data. Due to the nature of predictions, the longer the predictor iterates on its own predicted data, the accuracy of the prediction deteriorates. Once new actual new network data is available, the short-term prediction for the next time instant and the iterative sub-process for further time instants may start again.

The network management apparatus may further comprise a network management module configured to perform corrective network management actions based on the predicted future network state vector. For example, the network management module may reconfigure the network or individual network elements in case the predicted network state vector indicates with a reasonably probability that a fault state may happen in the future. The network management module may change any kind of appropriate network parameter in response such indication in order to prevent the expected fault state from actually happening.

The above network management apparatus may be implemented by at least one processor and at least one memory including computer program code, the at least one memory and the computer program code configured to, with the at least one processor, cause the apparatus at least to perform the above functions such as receiving network data, transforming the received network data, and predicting a future network state vector.

Alternatively, the above network management apparatus may be implemented by circuitry, for example network data receiving circuitry configured to receive network data, network data transformation circuitry configured to transform the received network data, and network state prediction circuitry to predict a future network state vector.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In another broad aspect, a network management method for performing network management activities on a communications network is disclosed. The method comprises receiving network data that is representative of the current condition of the communications network. The network data comprises a plurality of values indicative of the performance of network elements or of the communications network. Next, the received network data is transformed into a network state vector that is indicative of a current state of the network. Finally, a future network state vector for the network is predicted from the current network state vector of the network by applying a network state prediction. The network state prediction is based on a self-learning prediction algorithm having a memory for storing at least one internal state. The predicted future network state may be used for proactive corrective network management actions. The self-learning prediction algorithm may be based on recurrent neural networks such as a long-short term memory (LSTM) recurrent neural network as explained above.

In this method, said transforming the received network data may comprise applying a vector quantization algorithm to the network data for assigning the network data to network states and generating the network state vector that represents the probabilities of network states for the current network data. For example, K-Means or BSQ may be used for vector quantization.

Further, said transforming the received network data may comprise applying a sparsing transformation on the network state vector in order to suppress states with low probability.

The method may further comprise feeding a predicted future network state vector back to said transforming step to generate a new network state vector that is indicative of a next state of the network, for long-term prediction of further future network state vectors from the new network state vector. For example, the predicted future network state vector may be input to the sparsing transformation for the network state vector.

The above aspects disclosed for the network management apparatus may be applied in a similar way to the proposed method.

According to another broad aspect, a computer program comprising instructions for causing an apparatus to perform any of the above methods is disclosed. Furthermore, a computer readable medium comprising program instructions for causing an apparatus to perform any of the above methods is disclosed.

Furthermore, a non-transitory computer readable medium is disclosed, comprising program instructions stored thereon for performing at least the following: receiving network data, transforming the received network data, and predicting a future network state vector.

Implementations of the disclosed apparatus may include using, but not limited to, one or more processor, one or more application specific integrated circuit (ASIC) and/or one or more field programmable gate array (FPGA). Implementations of the apparatus may also include using other conventional and/or customized hardware such as software programmable processors.

It will be appreciated that method steps and apparatus features may be interchanged in many ways. In particular, the details of the disclosed apparatus can be implemented as a method, as the skilled person will appreciate.

Other and further embodiments of the present disclosure will become apparent during the course of the following discussion and by reference to the accompanying drawings.

BRIEF DESCRIPTION OF THE FIGURES

Embodiments of the disclosure are explained below in an exemplary manner with reference to the accompanying drawings, wherein.

DETAILED DESCRIPTION

The present disclosure proposes a technique for data transformation that is specifically tailored for LSTM RNNs, to increase their long-term predictive capabilities on data sets that are unique to mobile networks. Instead of predicting future KPI values, the proposed approach uses a quantization to predict specific networks states, in particular; faults in the mobile network. This quantization step may be followed by a distance transformation, where instead of using hard, categorical decisions; the output of the distance transformation is made up of continuous values that represent the probability of belonging to the network states. In a similar manner, the output of the prediction process is made up of continuous values that represent the probability of belonging to the states.

The data transformation is not intended to be reversible, as the goal is not to predict actual future KPI values, but to forecast the state of the network or network element. This transformation is natural for fault prediction, where degradations can be encoded as unique states the network elements can reside in. As an additional consideration, states can generally be better translated for human understanding compared to just raw KPI values, by attaching descriptive labels to them such as degraded radio environment, degraded throughput stemming from high packet loss, etc. It is important to note that the prediction of states representing normal functioning could possibly be utilized for other network management or control tasks, such as cognitive network management functions.

The vector-quantization algorithm may be tailored to distribute quanta evenly in the training data regardless of density. This placement is helpful in order for the proposed distance transformation to be able to create transformed data that is well suited for LSTM RNNs.

Elements of the present disclosure are:
  The use of vector-quantization to generate discreet network states from network management data (PM, CM);
  A distance transformation and a sparseness enforcer function, that describes state affiliation probability using the network states;
  An LSTM RNN state predictor, using and predicting state affiliation probabilities.

Figure 1:
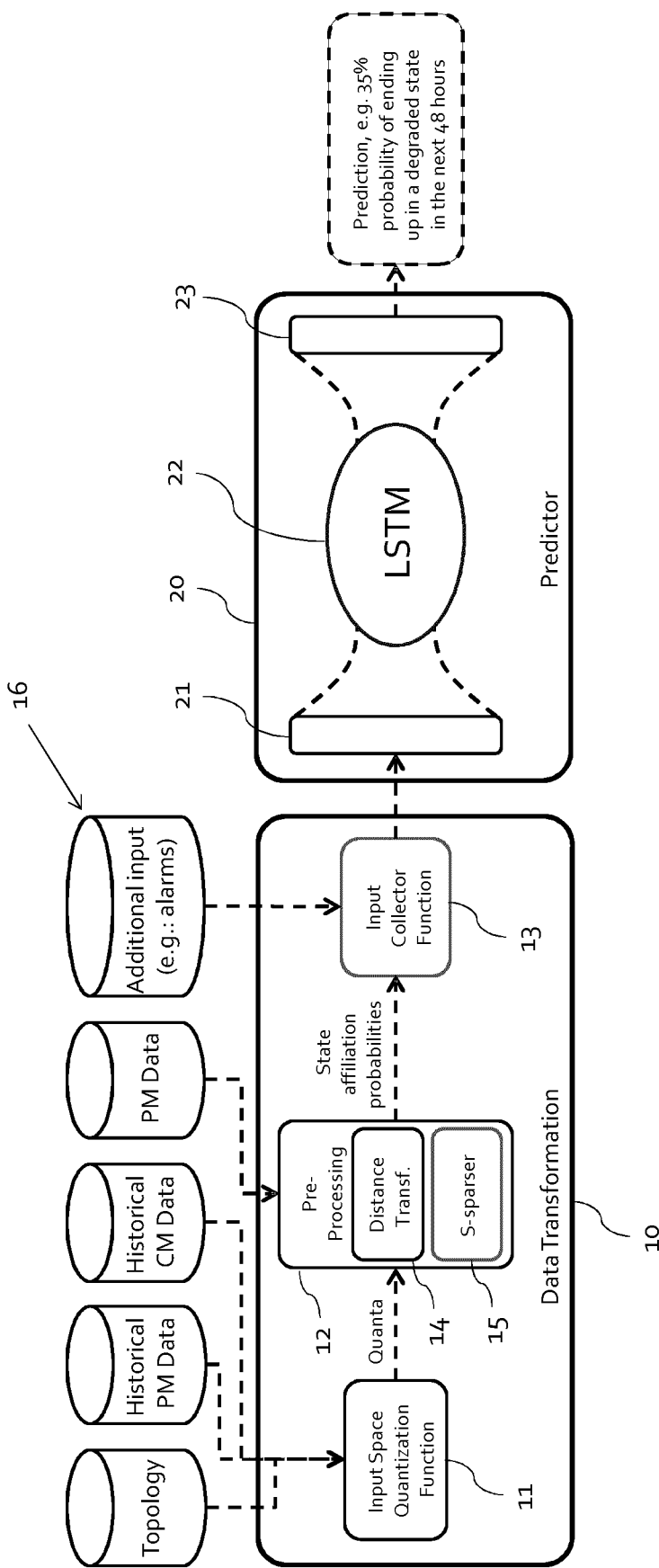
FIG. 1 shows a box diagram to illustrate an example of the proposed apparatus.

FIG. 1 illustrates a block diagram of a network management apparatus for a communications network (e.g. a mobile network) according to an example embodiment. Network data transformation unit 10 receives, via a network data receiving unit (not shown), various network data that is representative of the current condition of a communication network. In the illustrated example, the network data is stored in a network database 16, but the network data may be received from network elements or other network entities. The network data comprises a plurality of measured or stored values that are indicative of the performance of network elements or the network. The network data may comprise topology data, historical PM data, historical CM data, current PM data, and additional inputs (e.g. alarms). The network data may include Key Performance Indicators (KPI) of the network or its elements. The network data is assembled by the network data receiving unit to form a multidimensional network data vector. In embodiments, different data sets may be used.

Examples of KPIs in a mobile network are:
Total VoLTE traffic
PRB utilization, DL/UL
Avg. latency, DL/UL
PDCP SDU volume, DL/UL
RRC releases
RRC setup attempts
PDCP throughput, DL/UL
Avg. CQI
Avg. CQI offset
Avg. PUSCH SINR
Avg. active UEs, DL/UL
Avg. active Ues w/data in buffer, DL The network data transformation unit 10 transforms the network data into a network state vector that is indicative of a current state of the communications network. The network state vector has one element for each considered network state and encodes probabilities of the network being in a particular state.

The current network state vector for a particular time instant is supplied as input to a network state predictor 20 for predicting a future state of the network from the supplied input vector. For this, the network state predictor 20 outputs a predicted network state vector where each vector elements represents the probability of the network being in this state in the next time instant. This predicted network state vector may be used by the network management apparatus to determine management activities to be applied on the monitored communications network, e.g. a corrective action to prevent a predicted fault of the network or one or more of its elements.

In embodiments, examples for the network states may be:
Normal states:
  Low throughput—low utilization
  Medium throughput—high utilization (few users w/low radio quality)
  High throughput—high utilization
Fault states:
  Bad CQI/SINR (interference from another cell because of tilt misconfiguration)
  Low throughput in a timeframe with usually high load (backhaul congestion)
  No incoming connections/UEs (sleeping cell)

Depending on the predicted probabilities for such network states, the network management apparatus may determine appropriate actions such as reconfigurations in the network or of network elements.

In the depicted example embodiment, the network data transformation unit 10 comprises a vector quantizer 11 for performing an input space quantization function. In operation, the quantizer comprises a set of quanta for clustering the input space. The quanta may have been learned before the quantizer is put in operation in an unsupervised leaning algorithm, e.g. based on historical PM and/or CM data, or derived differently, e.g. via appropriate initialization. A quantum may be considered a centroid of a cluster of the vector input space. Different quantization algorithms will be discussed below.

In any case, the set of quanta and the current network data is input to a pre-processing unit 12 that generates a vector of state affiliation probabilities from its input data. The vector of state affiliation probabilities and optionally additional (non-quantized) input data (e.g. network alarms) are assembled by an optional input collector unit 13 to form the network state vector for the current time instant. In some cases, the input collector unit 13 may rescale the network state vector to unit length to ensure representation of proper probabilities. The network state vector for the current time instant is then supplied as input to the network state predictor 20.

The network state predictor 20 comprises a self-learning prediction module 22 which may be based on a Recurrent Neural Networks (RNN). For example a Long-Short Term Memory RNN (LSTM) may be used by the prediction module 22. LSTMs were proposed in the paper by Sepp Hochreiter and Jürgen Schmidhuber, "Long short-term memory", Neural Computation 9(8): 1735-1780, 1997, which is incorporated by reference. A LSTM is a recurrent network having internal memory cells that can be arranged in memory cell blocks. A memory cell can have an internal input gate unit to protect the memory content from perturbation by irrelevant inputs, and an internal output gate unit to protect other units from perturbation by currently irrelevant memory content stored in the cell. Memory cells arranged in a memory cell block may share input/output gate units. A LSTM has multiple layers of units and is trained by a gradient-based learning algorithm enforcing constant error flow through internal states. Such neural networks can be advantageously employed for predicting discrete state variables from previous state variables.

In the depicted example, the generated network state vector is put in the input field of the LSTM which then calculates a corresponding output field 23 for the predicted network state vector of a future time instant. In order to guarantee that the elements of the predicted state vector properly represent probabilities for the network states and comply with the unit length requirement, a softmax function may be applied on the output field 23.

In more detail, in the shown example, the pre-processing unit 12 that generates the vector of state affiliation probabilities comprises a distance transformation 14 and a sparsing function 15. The distance transformation 14 may be a soft distance transformation that determines the distances between its input vector and each of the quanta of the quantizer 11 which represent the network states. In other words, the distance transformation calculates the respective distances between the current vector of network data as received from the network data receiving unit and the centroids of the clusters of the quantizer, which distances are measures of similarities between the network data and the respective network states. These distances or measures of similarity may be subject to a further transformation to generate estimates of state affiliation probabilities, e.g. by applying a logistic function on the respective distances. Optionally, the values of the network state vector calculated so far by the distance transformation 14 may be rescaled in order to guarantee that the elements of the state vector properly represent probabilities for the network states (i.e. the elements sum up to one). This rescaling may be of importance, if the distance values provided by the distance transformation 14 are directly used as inputs of the network state predictor 20, e.g. without sparsing that is described next.

In the depicted example, the calculated state affiliation probabilities are subject to an optional vector sparsing function 15 which suppresses states with a little probability by zeroing their respective probability values in the network state vector, thereby sparsing the number of relevant states for the subsequent state prediction 20. The sparsing function may be a s-sparser which retains the vector elements with the highest s probability values and zeros the remaining vector elements. Other sparsing techniques may be used, too. The sparsed network state vector is then supplied to the state prediction 20, possibly with further elements added by the optional input collector function 13. Such further elements can be based on other event-based data, such as for example alarm events collected from a Fault Management (FM) system of the network. This event-based data may be binary data indicating the occurrence of events in the network. As such event-based data may not need to be rescaled.

The proposed network state prediction can form a backbone of a strong fault prediction system, which could be implemented as a part of an automated network management system. Due to the variety of input types that the method can process, it is not limited to a specific use-case. It can be used in various parts of the automated network management system.

As mentioned earlier, the proposed approach does not aim at predicting the actual values that the mobile network measurements will take in the future, but predicts the state that the network will be in. For this it uses a quantization step, transforming the raw KPI space into a network state space. In embodiments, two algorithms are proposed for this task, the K-means and the Bounding Sphere Quantization (BSQ) algorithms.

The K-means and the BSQ algorithms use the same Expectation-Maximization framework but differ in the goal function they optimize. K-means inherently has a better average reconstruction error; however, it achieves this by over-representing dense parts of the data, resulting in quanta that are not meaningfully diverse. This results in lower actual quantum hit-accuracy (i.e. the ratio with which the correct quantum is predicted). Compared to this, BSQ is designed to represent the data with equal volume quanta.

This produces more meaningful quanta, with better resolution at sparse regions (e.g. the edges of the data), that the prediction method can make better use of, producing higher quantum accuracy, which may be preferred. While in a lot of applications K-means is a solid and good choice for vector quantization (or depending on the task, for clustering), for this task, especially for mobile network data, BSQ fits better. A detailed description of the BSQ algorithm can be found in: Marton Kajo, Benedek Schultz, Janne Ali-Tolppa, Georg Carle, "Equal-Volume Quantization of Network Data Using Bounding Spheres and Boxes", NOMS 2018-2018 IEEE/IFIP Network Operations and Management Symposium, which is included by reference in this disclosure.

Figure 2:
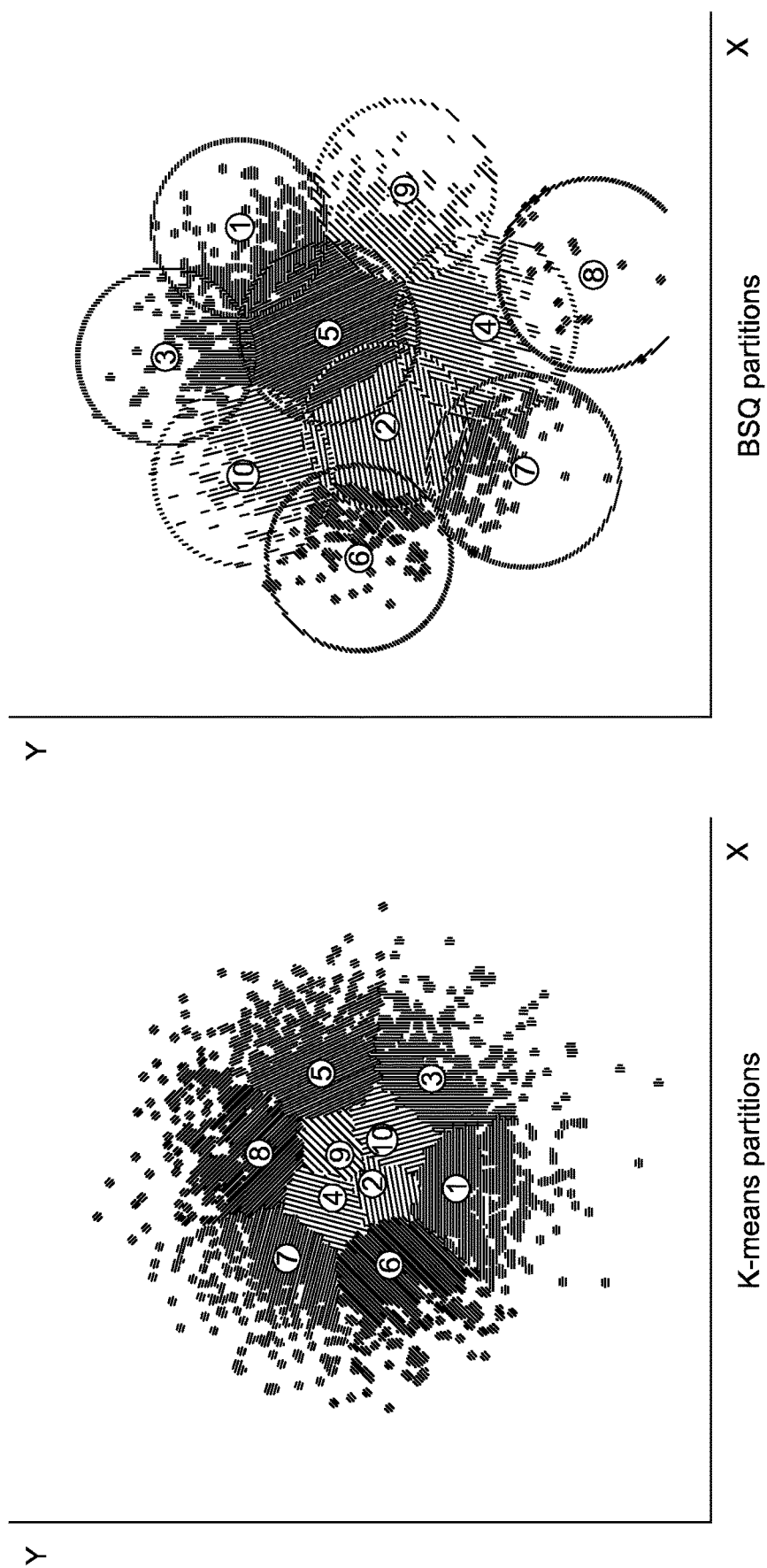
FIG. 2 shows a diagram to illustrate a comparison of K-means and BSQ on a small artificial example.

FIG. 2 illustrates the different clustering performed by K-means and BSQ on a small 2-dimensional example. One can see that the clusters generated by the K-means algorithm are more compact while the clusters of the BSQ provide a better resolution at sparse regions.

While the use of the BSQ algorithm may be beneficial in some cases, the proposed apparatus and method does not explicitly depend on it, which allows the use of other vector quantization algorithms. Although the proposed distance transformation is tailored to the BSQ algorithm, the general methodology is independent of the actual vector-quantizer, thus the proposed process could be used in conjunction with, or built upon other state-space dependent systems. The enhanced predictive capability can form the cornerstone of other proactive network management functions, such as load balancing or congestion avoidance.

The downside for using a quantized space for prediction is that the hard decisions caused by the quantization can create arbitrarily large differences for small changes of the input data at the quantum edges, making the predictor (e.g. the LSTM RNN) learn some artificial distinctions, thereby lowering possible accuracy. To counteract this, the soft distance transformation may be introduced, which generates soft affiliation probabilities based on the distance values generated by the quantizer. This way the "anchoring" effect of the quantization is retained, while the soft decisions on the quantum edges improve the prediction performance.

Figure 3:
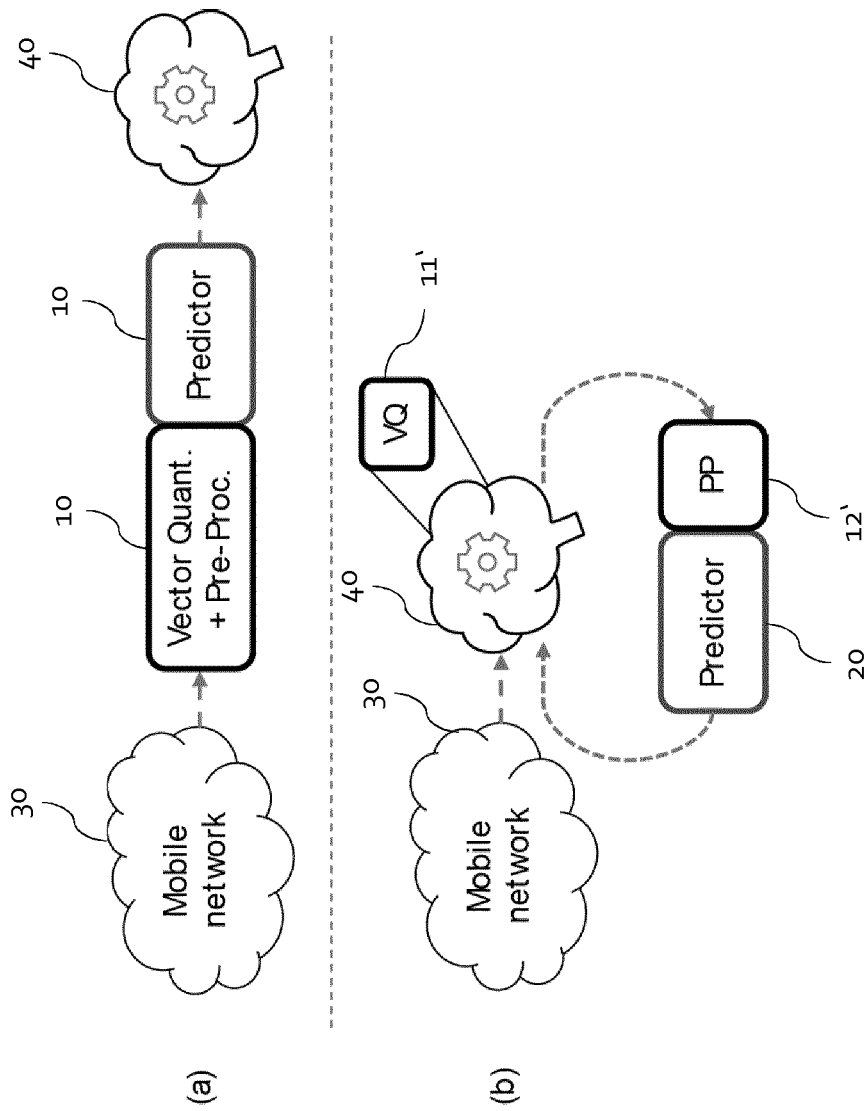
FIG. 3a illustrates an example for a network state prediction module as a pre-processing step for a diagnosis function.
FIG. 3b illustrates an example for a network state prediction module as a function built upon another module with an existing state space.

FIG. 3 illustrates different example embodiments of the proposed network state prediction approach. FIG. 3a illustrates an example of a network state prediction module as a pre-processing step for a network management and diagnosis function 40. The network state prediction module receives network data from a mobile network 30 and provides the predicted network state to the network management and diagnosis function 40. As in FIG. 1 before, the network state prediction module comprises the data transformation unit 10 with vector quantizer and pre-processing, and the network state predictor 20.

FIG. 3b illustrates an example of a network state prediction module as a function built upon another module with an existing state space. The another module by be a network management and diagnosis function 40 that receives network data from a mobile network 30 and has a build-in vector quantizer 11' providing the existing state space. Pre-processing module 12' comprises the above soft distance transformation 14 and uses this existing state space for generating a network state vector representing probabilities of the respective sates. Optionally, a vector sparser 15 may be provided in the pre-processing module 12'. The (possibly sparsed) network state vector is provided as input to predictor 20 which predicts the network state vector for future time instants. Predicted network state vectors for future time instants may then be looped back to the network management and diagnosis function 40 for diagnosing network faults and possibly performing corrective actions.

In the case of RNNs (or in general neural networks) a quantized space is represented by using a one-hot encoding, i.e. if the state space has k=8 quanta then the second quanta is represented by the vector (0, 1, 0, 0, 0, 0, 0, 0)=onehot(2). The RNN takes a sequence of such one-hot vectors, and outputs a softmax vector $v \in [0,1]^k$, where $\Sigma_{i=1}^k v_i = 1$.

The predicted state is then $p=\text{argmax } v_i$, so the highest probability state. The forecasting of the next timestep is then done by feeding the vector onehot(p) back to the input of the neural network predictor, iterating the process for longer term forecasting.

In example embodiments, the proposed pre-processing consists of two major parts: the distance transformation and the s-sparsing. Both will be explained in more detail in the following.

The soft-distance transformation is applied to the input of the predictor. For a KPI vector $m \in \mathbb{R}^k$ and quanta $q^{(j)} \in \mathbb{R}^k$, j=1 . . . k, an input vector $v \in [0,1]^k$ is generated so that $\tilde{v}_j = 1/\exp(c_j * \text{dist}(m, q^{(j)}))$, from which $v=\text{scale}(\tilde{v})$. Here scale is the scaling operation on a vector to unit length, while exp is the usual exponential function. The $c_j \in \mathbb{R}$, j=1 . . . k constants are related to the compactness of the quantum, they can either be chosen as constant between quanta for simplicity (i.e. $c_j=1$) or computed as the size of the quanta (for the BSQ algorithm this lends itself naturally, but it is also a simple estimation for other quantization methods).

The s-sparsing is done by first choosing a positive integer $s \in \mathbb{N}$, $s \le k$ called the support size. Then instead of using onehot(p) for the input of the predictor (so the hard decision of the highest probability state), a support vector $v^{(s)}$ of v with support size s is constructed, where all but the s largest values of v are zeroed out. For example, if v=(0.05, 0.45, 0.1, 0.35, 0.02, 0.01, 0.01, 0.01) with s=2, then $v^{(s)}$=(0, 0.45, 0, 0.35, 0, 0, 0, 0) is generated. After this the vector $v^{(s)}$ is rescaled, so that it has $\|v^{(s)}\|=1$ unit length, this is then the next input for the predictor.

Figure 4:
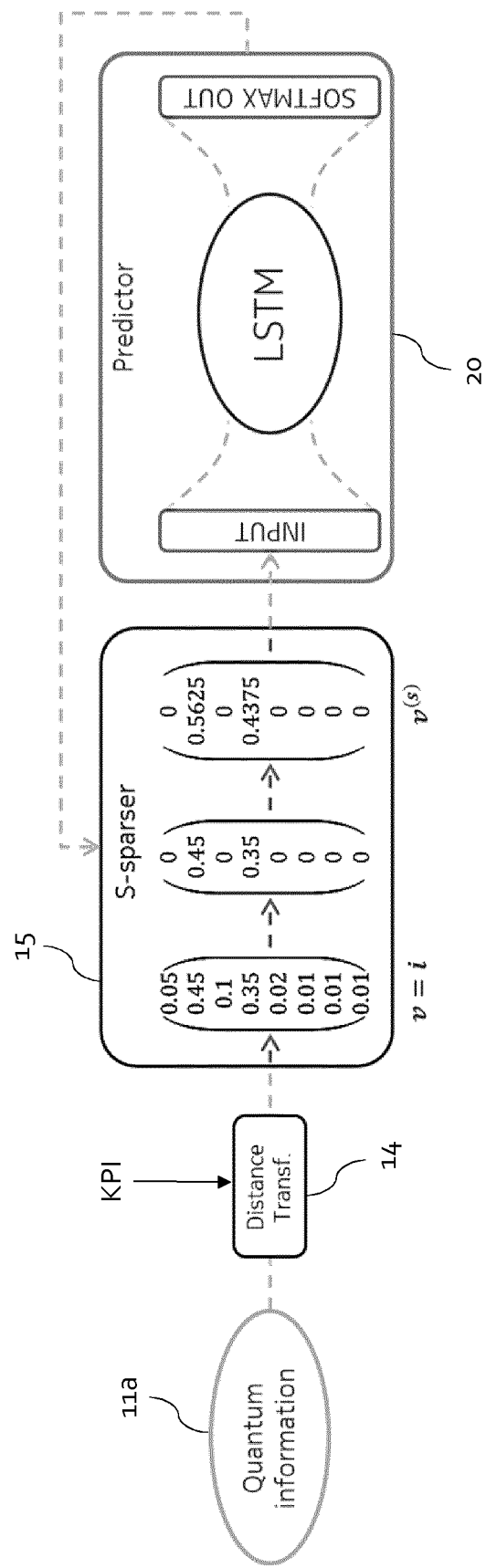
FIG. 4 shows a box diagram to illustrate the usage of network state prediction for long-term forecasting of network states.

FIG. 4 shows a box diagram to illustrate the usage of the network state prediction for long-term forecasting of network states. The KPI raw data is first put through the distance transformation 14, then the s-sparser 15 to obtain the sparse affiliation probabilities. For long-term forecasting of future state affiliation probabilities, the output of the predictor 20 (which comes from a softmax output layer) is fed directly to the s-sparser 15, thus providing the sparse affiliation probability vector that is fed back to the predictor. In other words, in many cases it is desired to forecast multiple steps forward. In this case, as the LSTM network can only predict one step forward, the predictions are iteratively fed back to the predictor network to generate multiple steps. The predictor output is not directly fed back as input; rather, it goes through the same (s) sparser as the historical data during training of the system.

The example shown in FIG. 4 illustrates an example for a network management apparatus comprising a distance transformation unit 14 that receives quantum information 11a from a quantizer (not shown) and a vector of KPI values. The distance transformation unit 14 applies a soft distance transformation to the vector of KPI values by measuring distances between the vector of KPI values and the set of quanta in the quantum information 11a. The distance transformation unit 14 generates the state affiliation probabilities for the set of quanta representing the network states, and propagates the probabilities to the state vector. The network state vector v is provided to the s sparser 15. The first vector in box 15 shows the state vector v as received by the sparser 15 with the probability values of the above example. The second vector shows the s=2 largest probability values retained and the remaining values zeroed. The third vector shows the state vector v(s) after rescaling so that the state probabilities sum up to one. The rescaled state vector is then supplied to the predictor 20, here an LSTM. For long-term prediction, the predicted state vector for a next time instant is, after the softmax function is applied thereto, looped back as input to the sparser 15 for prediction of further state vectors for future time instants. This sub-process can be repeated iteratively for predicting network state vectors longer in future from the vector of KPI values for a time instant. If a new KPI vector is available for a next time instant, the long-term prediction can be re-started from this new KPI vector and iteratively looping back predictions.

There are two extreme cases in sparsing to emphasize: If one uses s=1, then one gets the simple one-hot representation, so the usual LSTM predictor convention. In contrast if one sets s=k, so that the support size is maximal (the number of quanta), then essentially, the exact softmax output is feed back to the predictor network. There is a smooth transition between these two extremes, which enables the user to fine-tune the algorithm to the quantization and the LSTM network's size.

Using BSQ and the soft-distance also allows the LSTM network to naturally focus resources to learning the important parts of the state-space, instead of artificially enforcing it. Another interesting and great advantage of using state-space based forecasting instead of forecasting of real values is that while short term prediction is slightly better with real values (simply due to the quantization error introduced by the vector quantization), the long-term forecasting is more accurate, when using a quantized space. This can be explained by the "anchoring" that the quanta do, enabling the RNN to learn the important state changes instead of wasting resources on small minute changes that do not contribute the overall state of the network.

Figure 5:
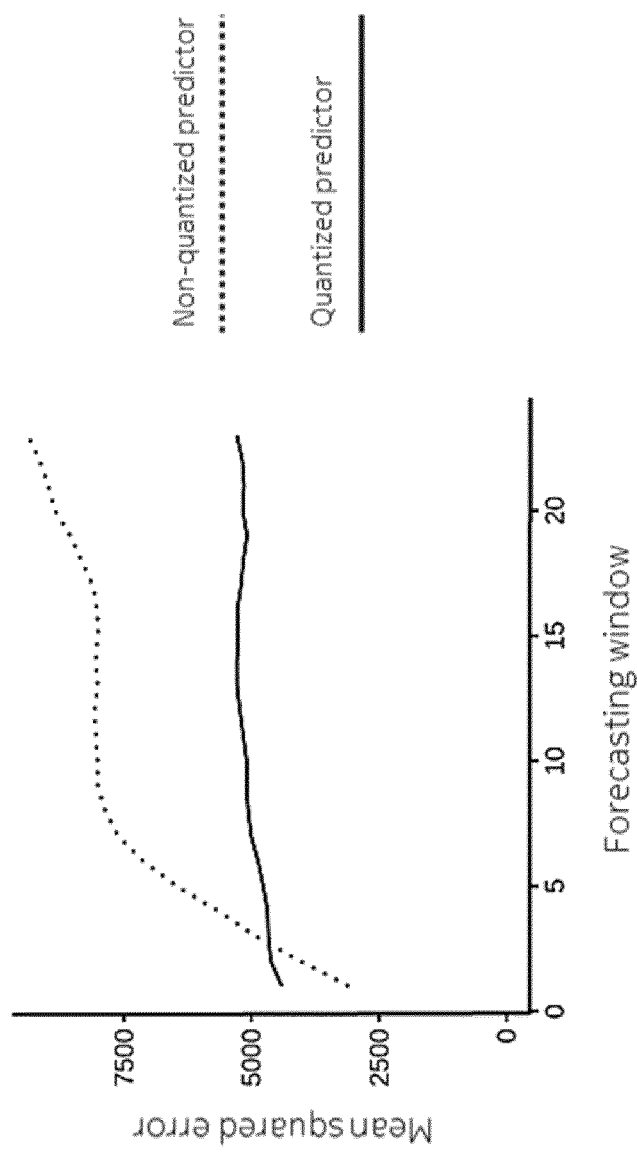
FIG. 5 shows a diagram to illustrate the long-term forecasting error for the quantized predictor versus a raw LSTM.

FIG. 5 shows a diagram to illustrate the long-term forecasting error for the quantized predictor versus using a raw LSTM without quantization. One can see that the forecasting error for the quantized predictor is lower that for the LSTM without quantization.

Figure 6:
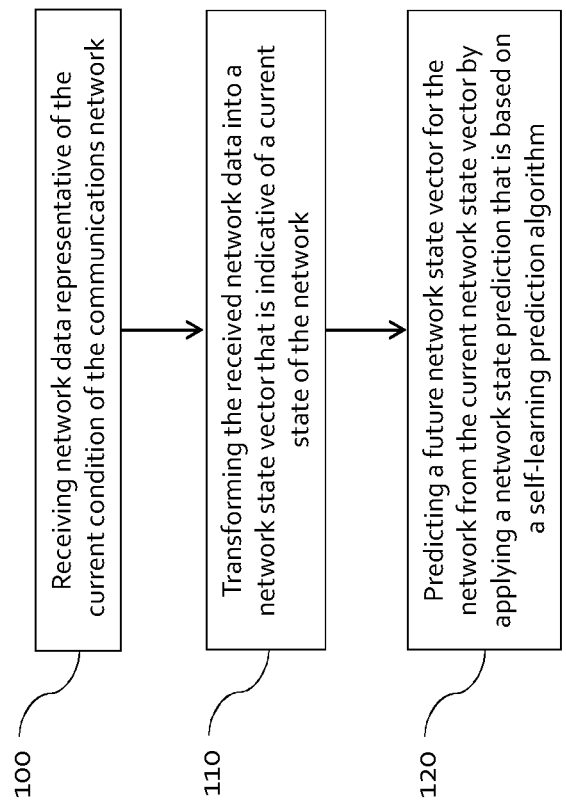
FIG. 6 shows a flowchart for an example network management method.

FIG. 6 shows a flowchart for an example network management method. The method may be used for performing network management activities on a communications network.

In step 100, network data representative of the current condition of the communications network is received. The network data comprises a plurality of measured values indicative of the performance of network elements of the communication network.

In step 110, the received network data is transformed into a network state vector that is indicative of a current state of the network. The transforming the received network data may comprise applying a vector quantization algorithm to the network data for assigning the network data to network states and generating the network state vector that represents the probabilities of network states. The transforming may further comprise applying a sparsing transformation on the network state vector.

In step 120, a future network state vector for the network is predicted from the current network state vector of the network by applying a network state prediction that is based on a self-learning prediction algorithm. A predicted future network state vector may be fed back to said transforming the received network data for prediction of further future network state vectors. Step 120 may be repeated for long-term prediction and the method iteratively generates more predicted state vectors for future time instants.

When new network data is available for the next time instant, the method may return to step 100 for processing of the new network data, and the method may cycle through the above steps.

Advantages of the proposed prediction of network states are:
Fits very well with other network management approaches that rely on quantization, such as a CBR knowledge sharing or the anomaly detection system.
Both the quantization step and the distance transformation make the network data easier to explain to humans.
An enabler for the following functionalities: early warnings, proactive self-healing.

It should be further noted that the description and drawings merely illustrate the principles of the proposed device. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed device. Furthermore, all statements herein providing principles, aspects, and embodiments of the invention, as well as specific examples thereof, are intended to encompass equivalents thereof.

| Abbreviation | Meaning |
| --- | --- |
| BSQ | Bounding-Sphere Quantization |
| CM | Configuration Management |
| FM | Fault Management |
| KPI | Key Performance Indicator |
| NM | Network Management |
| PM | Performance Management |
| LSTM | Long-Short Term Memory |
| PM | Performance Management |
| RNN | Recurrent Neural Network |
| SON | Self-Organizing Network |

The invention claimed is:

1. Network management apparatus comprising
network data receiving means for receiving network data that is representative of the current condition of a communications network, the network data comprising a plurality of values indicative of the performance of network elements;
network data transformation means for transforming the received network data into a network state vector that is indicative of a current state of the network; and
network state prediction means for, based on the current network state vector, outputting a predicted future network state vector of the network, where each vector element of the predicted future network state vector represents a probability of the network being in this state in a next time instant, the network state prediction means comprising a self-learning prediction module having a memory for storing at least one internal state.

2. Network management apparatus of claim 1, wherein the network data transformation means comprises a vector quantizer configured for transforming a vector of network data into a network state space.

3. Network management apparatus of claim 2, wherein the vector quantizer is based on the K-Means or the Bounding Sphere Quantization algorithm.

4. Network management apparatus of claim 1, wherein the network data transformation means comprises a distance transformation module configured for generating the network state vector representing probabilities of network states.

5. Network management apparatus of claim 4, wherein the distance transformation module applies, based on the quanta of the vector quantizer, a soft-distance transformation on the vector of network data.

6. Network management apparatus of claim 1, wherein the network data transformation means comprises a data sparsing module configured for suppressing elements of the network state vector representing a low probability for a corresponding network state.

7. Network management apparatus of claim 6, wherein the data sparsing module is based on the s-sparsing algorithm that zeros all vector elements but the s largest elements and subsequently rescales the network state vector to unit length.

8. Network management apparatus of claim 1, wherein the self-learning prediction module comprises a recurrent neural network, in particular a long-short term memory recurrent neural network.

9. Network management apparatus of claim 1, wherein the network state prediction means comprises a softmax module configured to generate a network state vector of unit length.

10. Network management apparatus of claim 1, wherein a predicted future network state vector is fed back to the network data transformation means to generate a new network state vector that is indicative of a next state of the network, for long-term prediction of further future network state vectors from the new network state vector.

11. Network management apparatus of claim 1, further comprising a network management module configured to perform corrective network management actions based on the predicted future network state vector.

12. Network management method for performing network management activities on a communications network, comprising:
  receiving network data that is representative of the current condition of the communications network, the network data comprising a plurality of values indicative of the performance of network elements;
  transforming the received network data into a network state vector that is indicative of a current state of the network; and
  based on the current network state vector, outputting a predicted future network state vector for the network from the current network state vector of the network, where each vector element of the predicted future network state vector represents a probability of the network being in this state in a next time instant, by applying a network state prediction that is based on a self-learning prediction algorithm having a memory for storing at least one internal state.

13. Method of claim 12, wherein said transforming the received network data comprises applying a vector quantization algorithm to the network data for assigning the network data to network states and generating the network state vector that represents the probabilities of network states.

14. Method of claim 12, wherein said transforming the received network data comprises applying a sparring transformation on the network state vector.

15. Method of claim 12, further comprising feeding a predicted future network state vector back to said transforming step to generate a new network state vector that is indicative of a next state of the network, for long-term prediction of further future network state vectors from the new network state vector.

* * * * *